US007134416B2

(12) United States Patent
Lawes

(10) Patent No.: US 7,134,416 B2
(45) Date of Patent: Nov. 14, 2006

(54) ROTARY VALVE SEAL

(75) Inventor: Keith T. Lawes, Poole (GB)

(73) Assignee: RCV Engines Limited (GB)

( * ) Notice: Subject to any disclaimer, the term of this patent is extended or adjusted under 35 U.S.C. 154(b) by 0 days.

(21) Appl. No.: 10/515,931

(22) PCT Filed: May 19, 2003

(86) PCT No.: PCT/GB03/02136

§ 371 (c)(1),
(2), (4) Date: Nov. 24, 2004

(87) PCT Pub. No.: WO03/100232

PCT Pub. Date: Dec. 4, 2003

(65) Prior Publication Data

US 2005/0166885 A1 Aug. 4, 2005

(30) Foreign Application Priority Data

May 28, 2002 (GB) ................................ 0212256.2
Oct. 25, 2002 (GB) ................................ 0224835.9
Mar. 20, 2003 (GB) ................................ 0306350.0

(51) Int. Cl.
*F01L 7/16* (2006.01)
*F16K 5/00* (2006.01)

(52) U.S. Cl. ................................ 123/190.17; 251/314

(58) Field of Classification Search .............. 123/80 C, 123/80 BA, 190.1, 190.2, 190.17; 251/314
See application file for complete search history.

(56) References Cited

U.S. PATENT DOCUMENTS 1,442,523 A 1/1923 Goby
2,273,179 A 2/1942 Davison
4,019,487 A * 4/1977 Guenther ............... 123/190.17
5,474,036 A 12/1995 Hansen et al.

FOREIGN PATENT DOCUMENTS

CH 83185 A 4/1920
CH 85169 A 5/1920
DE 9209896 U1 11/1992
DE 10034679 A1 1/2002

* cited by examiner

*Primary Examiner*—Stephen K. Cronin
*Assistant Examiner*—Hyder Ali
(74) *Attorney, Agent, or Firm*—Christensen O'Connor Johnson Kindness PLLC

(57) ABSTRACT

The invention relates to a valve seal mechanism for a rotatable valve assembly that provides a sealing function between a rotating first valve element and a fixed second valve element as used in a rotary cylinder valve engine. In one embodiment the seal mechansim comprises a substantially rigid sealing frame which surrounds and sealingly engages the periphery of the valve port of one of the cyclindrical valve elements and also sealingly engages a surface of the other cylindrical valve element. In another embodiment, the seal mechanism comprises a resiliently deflectable tubular element of variable diameter, the tubular element being mounted around a first valve element with an aperture of the tubular element being radially aligned with a valve port of the first valve element, the tubular element being biased radially outward of the first valve element.

45 Claims, 9 Drawing Sheets

ROTARY VALVE SEAL

The present invention relates to a seal and more particularly the invention relates to a valve seal mechanism for a rotatable valve assembly that provides a sealing function between a rotating first valve element and a fixed second valve element.

A rotary valve comprises a first cylindrical element having an internal chamber formed with at least a first valve port, and a second cylindrical element formed with at least a second valve port. The first cylindrical element is disposed within the second cylindrical element. The first and second elements are rotatable relative to one another to a position in which the first and second valve ports are aligned. When so aligned fluid can flow through the ports into or out of the chamber of the first cylindrical element.

One application of a rotary valve is within a rotary cylinder valve engine. Such rotary cylinder valve four stroke engines are known but none have been commercially successful in a mainstream application. This is primarily because it has proven to be extremely difficult to design an effective four stroke rotary cylinder valve sealing mechanism between a port formed in the rotating cylinder and the radially outer valve ring. This is due to the tight sealing tolerances the valve must maintain whilst operating with limited lubrication, large thermal stresses and high surface speeds.

According to a first aspect of the invention there is provided a valve seal mechanism for a rotary valve comprising a first cylindrical valve element and a second cylindrical valve element each formed with a respective valve port, at least one of the cylindrical valve elements being rotatable relative to the other to a position in which the ports in each cylindrical valve element are aligned, the seal mechanism comprising a substantially rigid sealing frame adapted to substantially surround and sealingly engage the periphery of the valve port of one of the cylindrical valve elements, the arrangement being such that, in use, the sealing frame sealingly engages a surface of the other cylindrical valve element.

Preferably the seal mechanism is such that, in use, a predetermined surface area of the sealing frame is exposed to an internal chamber of one of the cylindrical valve elements such that the pressure within the internal chamber acts on a predetermined surface area of the sealing frame to bias the sealing frame into sealing engagement with the other cylindrical valve element.

Preferably the sealing frame sealingly engages the surface of the other cylindrical valve element with a sealing force which increases with the pressure within the internal chamber.

The skilled person will appreciate that the sealing frame sealingly engages the surface of the other cylindrical valve element with a sealing force which decreases with a decrease of pressure within the internal chamber.

Preferably the sealing frame comprises a first curved surface and a second curved surface, the first curved surface being a sealing and a bearing surface, the arrangement being such that, in use, the first curved surface sealingly engages the second valve element and is slideable with a radially inner surface of the second valve element.

Preferably the sealing frame is held within a recess on the first cylindrical valve element.

Preferably the sealing frame has a substantially 'L' shaped cross section.

Preferably the sealing frame is adapted to substantially surround and sealingly engage the periphery of the valve port of the first cylindrical valve element to rotate with the first cylindrical valve element, the first curved surface of the sealing frame being radially outer of the first cylindrical valve element and the second curved surface of the sealing frame being radially inner of the first cylindrical valve element.

Alternatively, the sealing frame comprises a first curved surface and a second planar surface, the first curved surface being a sealing and a bearing surface, the arrangement being such that, in use, the first curved surface sealingly engages the second valve element and is slidable with a radially inner surface of the second valve element.

Preferably the first cylindrical valve element is formed with a bore which is coaxial with the valve port of the first cylindrical valve element the sealing frame being received within the bore so that the curved surface of the sealing frame is radially outwards of the first cylindrical valve element and the planar surface is radially inwards of the first cylindrical valve element. Preferably the seal mechanism further comprises biasing means adapted to bias the sealing frame radially outwardly of the first valve element in a direction towards the second valve element.

Preferably the biasing means has a dual function to both bias the sealing frame radially outwardly of the first cylindrical valve element whilst also providing sealing engagement between the sealing frame and the first cylindrical valve element.

Preferably either the sealing frame of the seal mechanism or the lining of the second cylindrical valve element is made from a bronze alloy material. Most preferably the sealing frame is made from a bronze alloy material and the lining of the second cylindrical valve element is made from a harder material.

According to a second aspect of the present invention there is provided a valve sealing mechanism for a rotary cylinder valve engine comprising a first and a second cylindrical valve element each formed with a respective valve port, at least one of the valve elements being rotatable relative to the other to a position in which the respective ports in each valve element are aligned, the sealing mechanism comprising a sealing frame being adapted to be mounted on the first cylindrical valve element, the arrangement being such that, in use, a predetermined surface area of the sealing frame is exposed to a combustion chamber of the engine such that the pressure within the combustion chamber acts on the predetermined area of the sealing frame to bias the sealing frame radially outwardly of the first cylindrical valve element.

Preferably the sealing frame sealingly engages a surface of the other cylindrical valve element, the arrangement being such that in use the sealing frame sealingly engages the surface of the other cylindrical valve element with a sealing force that increases with the internal pressure within the combustion chamber.

This is advantageous in that, when the pressure is relatively high during the combustion stroke of the engine, the sealing force must also be relatively high. However high sealing forces lead to high frictional forces which reduce engine efficiency. Thus, when the pressure within the combustion chamber is not relatively high, the sealing force and the frictional forces decrease such that engine efficiency is not compromised.

Preferably the sealing mechanism is such that the peak sealing force due to the pressure within the combustion chamber is always less than or equal to 200 kg force per 50 $cm^3$ of combustion chamber capacity. Most preferably the peak sealing force due to the pressure within the combustion chamber is always less than or equal to 100 kg force per 50 $cm^3$ of combustion chamber capacity.

Preferably the sealing mechanism further comprises biasing means adapted to bias the sealing frame in a radial direction from the first cylindrical valve element.

Preferably either the sealing frame of the seal mechanism or the lining of the second cylindrical valve element is made from a bronze alloy material. Most preferably the sealing frame is made from a bronze alloy material and the lining of the second cylindrical valve element is made from a harder material.

According to a third aspect of the present invention there is provided a valve seal mechanism for a rotary valve, the rotary valve comprising a first and a second cylindrical valve element each formed with a respective valve port, at least one of the valve elements being rotatable relative to the other to a position in which the ports in each cylindrical valve element are aligned, the sealing mechanism comprising a sealing frame and biasing means comprising a first portion adapted to sealingly engage with the first cylindrical valve element and a second portion adapted to sealingly engage with the sealing frame, the biasing element being such that, in use, the biasing element biases the sealing frame in a radial direction from the first cylindrical valve element.

Preferably the sealing frame and biasing means are separate components.

Preferably the biasing means of the first, second or third aspects of the present invention comprise biasing means in the form of a spring, a portion of which is disposed between the sealing frame and the first cylindrical valve element.

Preferably the spring comprises a cantilevered element, an outer periphery of which is adapted to be secured to the first cylindrical valve element so as to be constrained relative to the first cylindrical valve element, and an inner portion of which is spaced from the outer peripheral portion in a direction generally towards a longitudinal axis of the valve port of the first cylindrical valve element, the arrangement being such that, in use, the inner portion of the spring is movable radially relative to the first cylindrical valve element and the inner portion is in contact with part of the sealing frame.

Preferably the cantilevered element of the spring comprises a resiliently deflectable plate having a central aperture, the outer periphery of the plate being adapted to be secured to the first cylindrical valve element such that the outer periphery is constrained from moving relative to the first cylindrical valve element, an inner portion of the plate being spaced from the outer peripheral portion in a direction generally towards a longitudinal axis of the valve port of the first cylindrical valve element so that the inner portion is cantilevered.

Preferably the plate is constrained so that the aperture in the plate is aligned with the valve port of the first cylindrical valve element, the inner portion of the plate being in contact with the periphery of the sealing frame the arrangement being such that the sealing frame is biased radially outwardly of the first cylindrical valve element by the inner portion of the plate.

Preferably the inner portion of the plate is spaced from the first cylindrical valve element such that a recess is defined between the inner portion of the plate and the first cylindrical valve element so that a predetermined surface area of a radially inner portion of the plate is exposed to a chamber within the first cylindrical valve element, the arrangement being such that, in use, the pressure within the chamber acts on the predetermined surface area of the plate to further bias the inner portion of the plate and the sealing frame in a radial direction from the first cylindrical valve element.

Preferably the spring has a dual function to both bias the sealing frame radially outwardly of the first cylindrical valve element whilst also providing sealing engagement between the sealing frame and the first cylindrical valve element.

Preferably the spring is manufactured from a metal material. The spring is preferably a sheet metal.

Alternatively, the spring is slidingly received within a bore formed in the first cylindrical valve element, the bore being coaxial with the valve port formed in the first cylindrical valve element, the spring biasing the sealing frame radially outwardly of the first cylindrical valve element.

Preferably the bore and the spring are of circular outline. Preferably the bore has a planar base.

Preferably a sealing element is provided between the sealing frame and the first cylindrical valve element to effect a seal between the sealing frame and the first cylindrical valve element.

Preferably the sealing element comprises a sealing ring which extends around the periphery of the sealing frame.

The sealing frame may be formed with a peripheral indent, the sealing ring being located in the indent.

Preferably the sealing ring is formed from a strip of metal material bent into a substantially circular shape so that the two ends of the strip are adjacent one another to define a gap therebetween.

Preferably the gap has to be decreased to enable the sealing ring to be inserted into the bore formed in the first cylindrical valve element.

Preferably the spring abuts the sealing member so as to bias the sealing member into engagement with the sealing frame and the first cylindrical valve element.

Preferably the spring comprises a wave spring having a plurality of crested and troughed regions, the crested regions being in contact with the base of the bore and the troughed regions being in contact with the sealing element. Preferably an inner portion of the sealing frame is spaced from the first cylindrical valve element by the spring so that a predetermined surface area of a radially inner portion of the sealing frame is exposed to a chamber within the first cylindrical valve element, the arrangement being such that, in use, the pressure within the chamber acts on the predetermined surface area of the sealing frame to further bias sealing frame in a radial direction from the first cylindrical valve element.

Preferably the swept angle of the valve port formed in the first cylindrical valve element is smaller than the swept angle of the valve port or ports formed in the second cylindrical valve element. Thus, when the valve port formed in the first cylindrical valve element is aligned with an inlet valve port formed in the second cylindrical valve element, the inlet tract is stepped, and when the valve port formed in the first cylindrical valve element is aligned with an outlet valve port formed in the second cylindrical valve element the outlet tract is stepped.

Preferably either the sealing frame of the seal mechanism or the lining of the second cylindrical valve element is made from a bronze alloy material. Most preferably the sealing frame is made from a bronze alloy material and the lining of the second cylindrical valve element is made from a harder material.

According to a fourth aspect of the invention there is provided a valve sealing mechanism for a rotary valve element comprising a first and a second cylindrical valve element each formed with a respective valve port, at least one of the cylindrical valve elements being rotatable relative to the other cylindrical valve element to a position in which the ports in each cylindrical valve element are aligned, the sealing mechanism comprising a resiliently deflectable tubular element, the diameter of which is variable, the tubular element being formed with an aperture, the tubular element being adapted be mounted on the first cylindrical valve element to extend substantially around the first cylindrical valve element such that the aperture of the tubular element is radially aligned with the valve port of the first cylindrical valve element, the tubular element being resiliently biased radially outwardly of said first cylindrical valve element.

Preferably the tubular element is formed from a strip of material that is curved such that two ends of the strip face each other, the tubular element being such that the ends are substantially parallel to, and spaced a small distance apart from, one another to define a gap between the two ends, the gap enabling the diameter of the tubular element to be varied.

Preferably, the arrangement is such that in the assembled state the tubular element is mounted on the first cylindrical valve element, the tubular element being resiliently biased radially outwardly of the first cylindrical valve element into sealing contact with the second cylindrical valve element.

Preferably a part of the tubular element that surrounds the aperture of the tubular element is biased further radially outwardly of the first cylindrical valve element by biasing means located between the first cylindrical valve element and the tubular element.

Preferably, in use, the part of the tubular element that surrounds the aperture of the tubular element sealingly engages the periphery of the valve port of the first cylindrical valve element, said part also sealingly engaging the second cylindrical valve element.

Preferably the remainder of the tubular element sealingly engages the second cylindrical valve element but is spaced from the first cylindrical valve element to define a clearance between the first cylindrical valve element and the tubular element.

Preferably, in use, the first cylindrical valve element is cooled by directing cooling fluid through the clearance between the first cylindrical valve element and the tubular element so that the cooling fluid directly cools the surface of the first cylindrical valve element.

Preferably the cooling fluid is oil and thus also lubricates the first cylindrical valve element.

Preferably the tubular element is attached to the first valve element, the arrangement being such that, in use, the tubular element is driven by the first cylindrical valve element and the aperture in the tubular element is aligned with the valve port in the first cylindrical valve element.

Most preferably the tubular element is attached to the first valve element by a dowel or bolt which extends through the tubular element and into part of the first cylindrical valve element.

Alternatively the tubular element is attached to the first valve element by a first lug on the tubular element and a second lug on the first cylindrical valve element, rotation of the first cylindrical valve element causing the lugs to engage.

Preferably the gap in the tubular element is adjacent but rotationally in front of the point of attachment the arrangement being such that, in use, the tubular element is rotationally behind the point of attachment so minimising any tendency of the diameter of the tubular element to increase due to its own frictional drag.

Preferably the tubular element is adapted to be mounted in a circumferential recess in the first cylindrical valve element, the arrangement being such that the tubular element is restrained from axial movement relative to the first cylindrical valve element but being radially movable.

Preferably either the tubular element of the seal mechanism or the lining of the second cylindrical valve element is made from a bronze alloy material. Most preferably the lining of the second cylindrical valve element is made from a bronze alloy material and the tubular element is made from a harder material.

According to a fifth aspect of the invention there is provided a substantially rigid sealing frame for the seal mechanisms of the first to fourth aspects of the invention.

According to a sixth aspect of the invention there is provided a rotary valve cylinder engine incorporating the sealing mechanisms of any one of the first to fourth aspects of the invention.

In one embodiment of the invention the rotary cylinder valve engine comprises a rotatable cylinder formed with an internal combustion chamber in communication with a first valve port, a second cylindrical valve element comprising a second cylinder formed with at least a second valve port, the first cylinder being rotatable relative to the second cylinder and the second cylinder being fixed relative to the engine casing.

Preferably the second cylinder has a fuel inlet port and an exhaust outlet port, the port on the first cylinder being rotatable to index with the respective inlet port and exhaust port. The rotary cylinder valve engine may comprise a third ignition port.

The invention stems from an understanding that, in order to work effectively a rotary valve seal should conform to the following four principles:

Firstly the valve must have an active sprung sealing mechanism. This is because thermal movements within an engine are an order of magnitude greater than the clearances that must be maintained to provide a reasonable combustion gas seal. Typically engine components will expand and distort by many tens or even hundreds of microns due to thermal affects, whereas to ensure adequate sealing of the combustion gas clearances must be no more than a few microns. A sprung sealing mechanism is thus required to maintain these small sealing clearances whilst allowing for comparatively large thermal distortions. The seal mechanism will also allow for production tolerances and wear.

Secondly it is desirable to have a static seal behind the sealing element to seal the leak path around the rear of the sealing element. We have found that the best method is to design the spring element so that it also forms a static seal against the rear of the sealing element. This means that known conventional springs cannot be used as gas would leak through the spring and around the rear of the sealing element.

Thirdly the seal must be arranged in such a way that the cylinder pressure augments the spring pressure, that is the cylinder pressure must force the sealing element against the second cylindrical valve element to improve the seal. However although it is very desirable for the cylinder pressure to augment the spring pressure, it is necessary to limit the seal area upon which the cylinder pressure acts. If the area is too large this additional sealing force becomes excessive causing a significant loss in performance and durability.

Fourthly whilst a mechanism obeying the above principles will adequately seal the combustion gas, provision must also be made to provide a secondary sprung sealing mechanism for the inlet and exhaust ports. If this is not done oil control and inlet manifold pressure stability will be poor.

The invention will now be described by way of example only with reference to the accompanying drawings in which.

Figure 1:
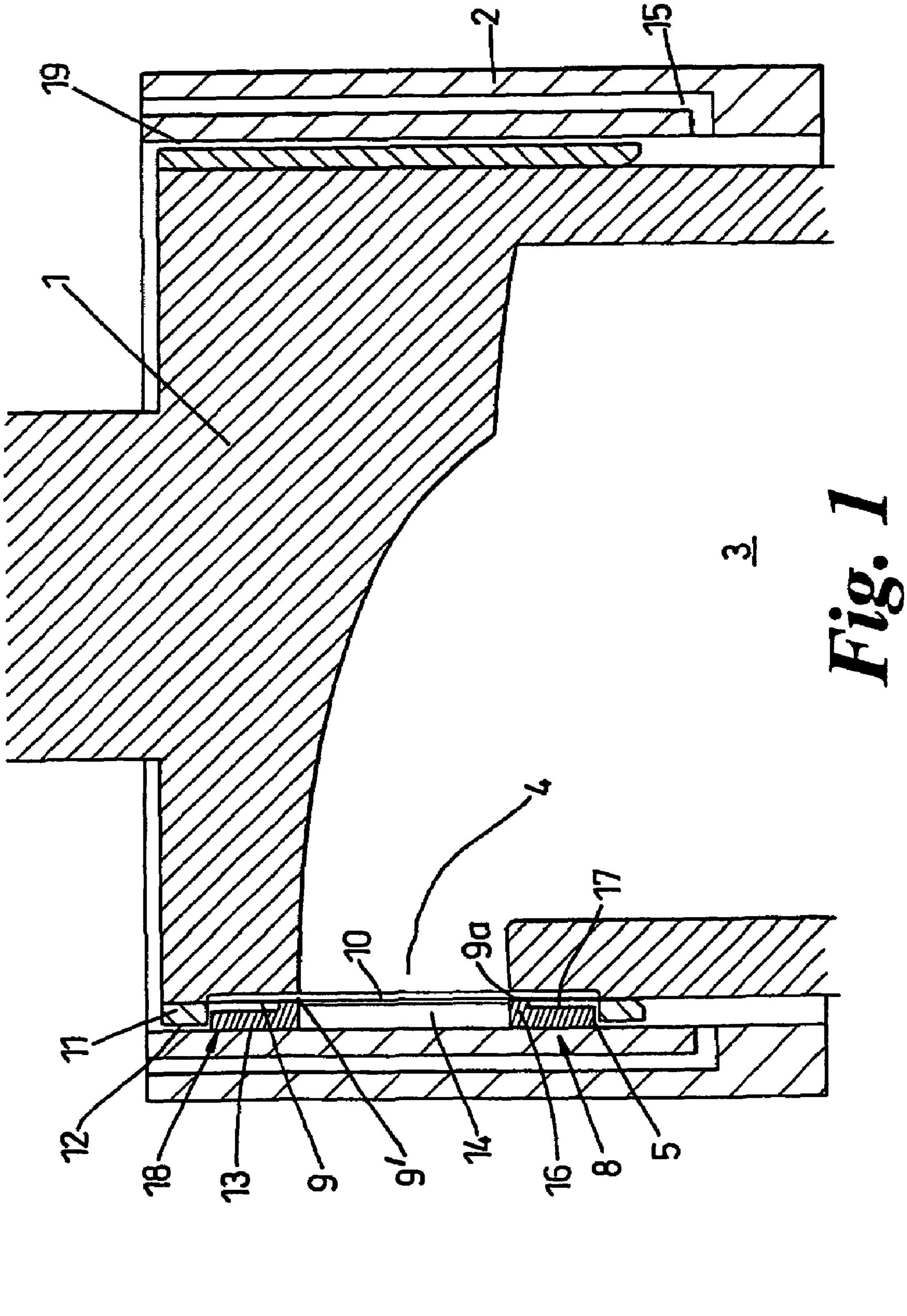
FIG. 1 is a cross sectional side view of the top end of a rotary cylinder valve engine having a sealing mechanism in accordance with the current invention.
Figure 2:
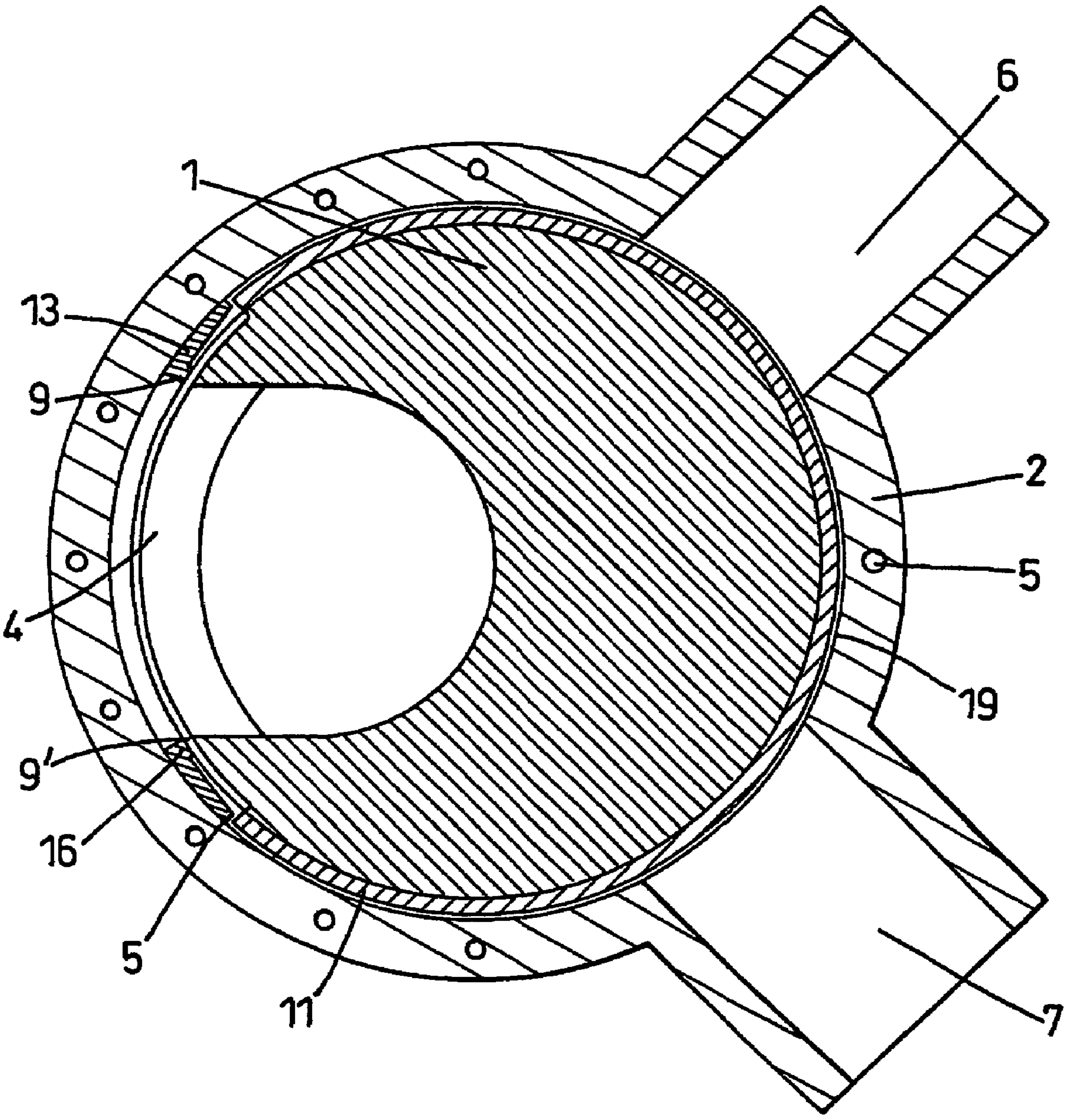
FIG. 2 is a cross sectional top view of the valve and sealing mechanism of FIG. 1.
Figure 3:
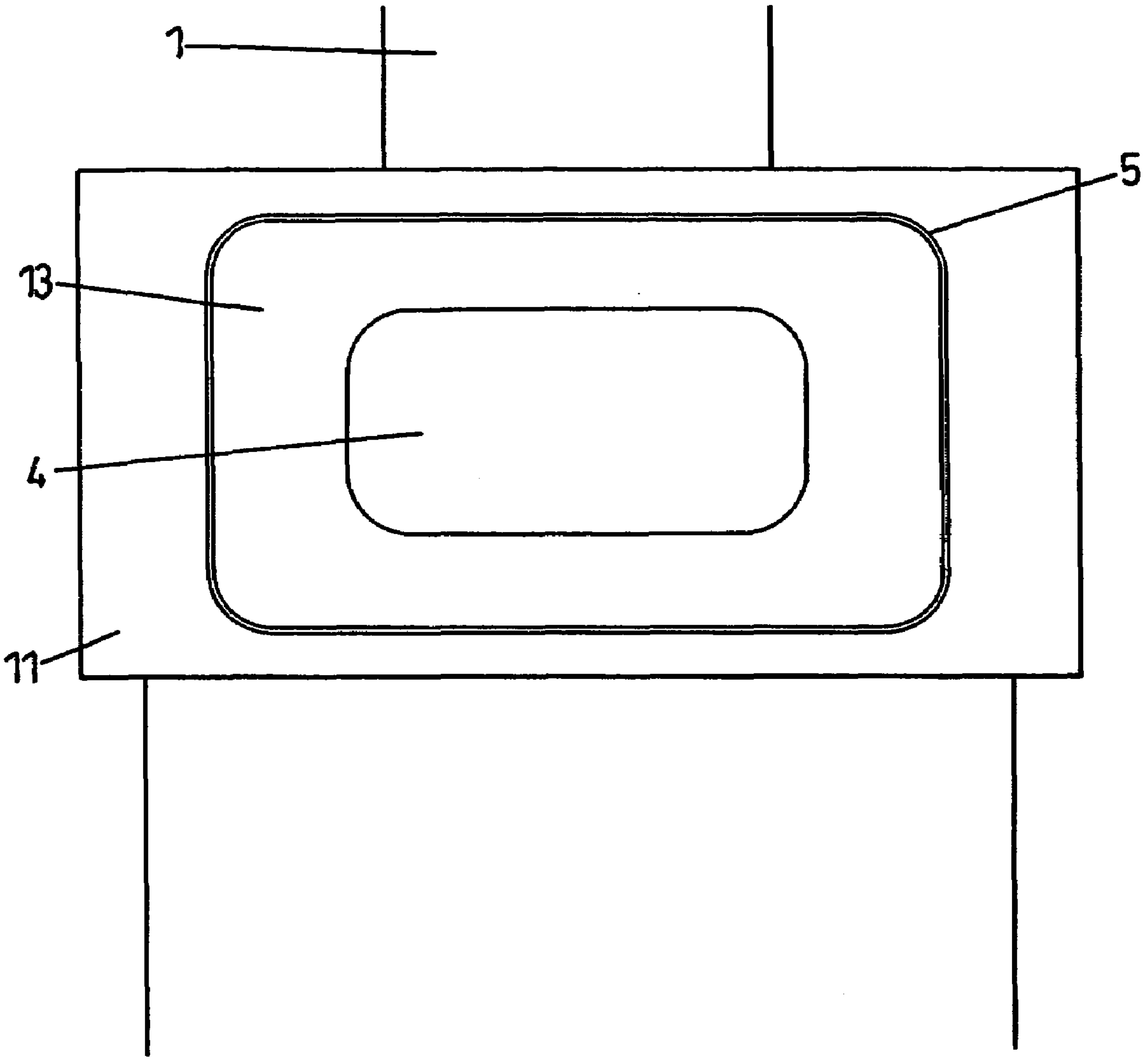
FIG. 3 is a side view of the valve and sealing mechanism of FIGS. 1 and 2.

Referring initially to FIGS. 1 to 3, a rotary valve of a rotary cylinder valve engine (not shown in full) comprises a first rotary cylindrical valve element 1 rotatably mounted within a second, fixed cylindrical valve element 2.

The first cylindrical valve element 1 comprises a cylinder having an internal combustion chamber 3 formed with a first valve port 4 at an upper end of the cylindrical valve element 1. An oblong recess 5 is formed in the exterior of the cylindrical valve element 1, the first valve port 4 being located within the recess 5. The oblong recess 5 extends radially through the side wall of the first cylindrical valve element 1.

The second cylindrical valve element 2 comprises a cylinder formed with a fuel inlet port 6 and an exhaust outlet port 7. A third port (not shown) may be provided to locate an ignitor such as a spark plug as is well known in the art. The second cylindrical valve element 2 may be lined with a thin cast iron sleeve (not shown). Elongated, internal cooling channels 15 extend through the second cylindrical valve element 2 in an axial direction, the channels 15 exiting from a lower part of the second cylindrical valve element 2.

A sealing mechanism generally indicated as 8 comprises biasing means formed by a planar spring in the form of a thin, flat, oblong plate 9 formed with a central aperture 10, the shape and size of the aperture 10 being substantially the same as the shape and size of the first valve port 4. The outer periphery of the plate 9 is secured to the part of the first cylindrical valve element 1 surrounding the recess 5 by virtue of an outer, cylindrical sleeve 11 which sandwiches the plate 9 between the first cylindrical valve element 1 and the sleeve 11. The sleeve 11 has a rectangular portion 12 cut out from one side, the portion 12 being substantially the same size and shape as the oblong recess 5. The sleeve 11 is slidably mounted around the exterior of the first cylindrical valve element 1 and is secured in a position with the rectangular cut out portion 12 adjacent the oblong recess 5 and the valve port 4 on the first cylindrical valve element 1.

The outer periphery of the plate 9 is thus constrained from moving relative to the first cylindrical valve element 1 by the sleeve 11. An inner portion 9_a_ of the plate 9 surrounds the aperture 10 and extends away from the outer periphery of the plate 9 in a direction generally towards the central axis of the first valve port 4. The inner portion 9_a_ of the plate 9 extends over the oblong recess 5 such that there is a clearance 9' between said inner portion 9_a_ of the plate 9 and the first cylindrical valve element 1. This clearance 9' is such that a predetermined surface area of the inner portion 9_a_ of the plate 9 is exposed to the combustion chamber 3 as will be further described herein after. The inner portion 9_a_ is not constrained from moving radially relative to the first cylindrical valve element 1 by the sleeve 11. The inner portion 9_a_ of the plate 9 is thus cantilevered and can move generally radially towards and away from the first cylindrical valve element 1.

The plate 9 is made from a resiliently deflectable material such as stainless steel so that the inner portion 9_a_ of the plate 9 resists movement towards or away from the first cylindrical valve element 1 and, when moved towards the first cylindrical valve element 1, the inner portion 9_a_ returns to its original position. The material chosen will minimise the effects of oxidation during combustion.

The sealing mechanism 8 further comprises a substantially rigid, oblong sealing frame 13 dimensioned to be received in the recess 5 in the first cylindrical valve element 1. The sealing frame 13 has a central, oblong aperture 14 of substantially the same shape and size as the valve port 4. A ridge 16 extends around the aperture 14 from a first curved face 17 of the sealing frame 13 in a direction substantially perpendicular to the plane of the sealing frame 13. The sealing frame 13 thus has a substantially 'L' shaped cross section. A second, opposed curved face 18 of the sealing frame 13 comprises a smooth bearing and sealing surface as will be further described hereinafter. The sealing frame 13 is manufactured from a metal material such as lead-bronze. The second cylindrical valve element 2 is made from a harder metal material such as iron. It will be appreciated that any other suitable materials could, alternatively be used.

There now follows a description of the assembly method of the seal mechanism 8.

The oblong plate 9 is placed in the recess 5 of the first cylindrical valve element 1 against the valve port 4 with the outer periphery of the plate 9 in contact with the part of the first cylindrical valve element 1 surrounding the recess 5. The tubular sleeve 11 is then slid over the first cylindrical valve element 1 and over the plate 9 to secure the outer periphery of the plate 9 between the first cylindrical valve element 1 and the sleeve 11. The sealing frame 13 is then placed against the plate 9 with the ridge 16 of the sealing frame 13 against the cantilevered inner portion 9_a_ of the plate 9 and the first cylindrical valve element 1 is then rotatably mounted within the second cylindrical valve element 2.

It will be appreciated that in order to slide the first cylindrical valve element 1 within the second cylindrical valve element 2, the sealing frame 13 is pressed radially inwardly towards the first cylindrical valve element 1 through resilient deformation of the cantilevered inner portion 9_a_ of the plate 9. Thus, when the above components are mounted in the rotary cylinder valve engine and because of the resilient properties of the plate 9, the cantilevered inner portion 9_a_ of the plate 9 biases the sealing frame 13 radially outwardly of the first cylindrical valve element 1 so that the sealing frame 13 is in sealing engagement with the second cylindrical valve element 2. The first cylindrical valve element 1 is otherwise not in contact with the second cylindrical valve element 2. Indeed there is a clearance 19 between the outer sleeve 11 and the second cylindrical valve element 2.

In use the first cylindrical valve element 1 rotates within the rotary cylinder valve engine and relative to the second cylindrical valve element 2 such that the first valve port 4 is sequentially aligned with the inlet, ignition and exhaust ports. When the valve port 4 is not aligned with the inlet and outlet ports 5, 6, gas within the combustion chamber 3 is prevented from escaping from the combustion chamber 3 by the sealing engagement of the outer sealing and bearing surface 18 of the sealing frame 13 with the second cylindrical valve element 2 and by the engagement of the cantilevered inner portion 9*a* of the plate 9 with the ridge 16 of the sealing frame 13. Thus the plate 9 is dual functional in that the plate 9 acts as a spring to bias the sealing frame 13 outwardly of the first cylindrical valve element 1 whilst also acting as a seal to prevent or, at least, inhibit gas flow between the sealing frame 13 and the first cylindrical valve element 1.

When the valve port 4 of the first cylindrical valve element 1 is aligned with the inlet or exhaust ports 5, 6, the sealing mechanism 8 defines a discrete gas flow path between the combustion chamber 3 and through the inlet or outlet ports 5, 6 via the valve port 4 in the first cylindrical valve element 1, the aperture 10 in the plate 9 and the aperture 14 in the sealing frame 13.

When the pressure within the combustion chamber 3 is relatively high as would be the case during the compression and ignition strokes of the engine, the gas pressure acts on the predetermined area of the cantilevered inner portion 9*a* of the plate 9 in the gap between the first cylindrical valve element 1 and the plate 9. The gas pressure acts to further bias the cantilevered inner portion 9*a* radially outwardly of the first cylindrical valve element 1. This enhances the sealing engagement of the bearing surface 18 of the sealing frame 13 with the second cylindrical valve element 2 and also enhances the sealing engagement between the plate 9 and the ridge 16 on the sealing frame 13.

The skilled person will appreciate that the predetermined area can be limited to ensure that the pressure exerted on the predetermined area is not excessive causing power losses and increased wear of the cylindrical valve elements. The predetermined area is limited such that the peak sealing force due to the pressure within the combustion chamber is always less than or equal to 200 kg force per 50 $cm^3$ of combustion chamber capacity. Preferably the peak sealing force due to the pressure within the combustion chamber is always less than or equal to 100 kg force per 50 $cm^3$ of combustion chamber capacity.

Thus the sealing frame 13 sealingly engages the surface of the second cylindrical valve element 2 with a sealing force which increases with an increase of the pressure within the combustion chamber 3 and decreases with a decrease of the pressure within the combustion chamber 3.

The clearance 19 between the outer sleeve 11 and the second cylindrical valve element 2 permits a degree of relative movement between these components. This allows for the relatively high thermal movements within the engine. Thus the above described components can expand so that the clearance 19 decreases and contract so that the clearance 19 increases without adversely affecting engine wear or performance.

Cooling of the first cylindrical valve element 1 and the sealing mechanism 8 is effected by pumping cooling fluid through coolant channels 15 in the second cylindrical valve element 2 and then over the lower parts of the rotating first cylindrical valve element 1. The cooling fluid would normally be the engine's lubricating oil. The above described sealing mechanism 8 functions very well in terms of sealing compression, but due to the comparatively high clearance 19 that must be maintained between the outer surface of the outer sleeve 5 and the second cylindrical valve element 9 there is some gas transaction between the crankcase cavity and the inlet port 6 and exhaust port 7 resulting in lubricant contamination of the combustion stream. This can result in oil contamination of the plug and a smoky exhaust. Control of the inlet manifold vacuum is also poor leading to unreliable idle and erratic low throttle running.

Figure 4:
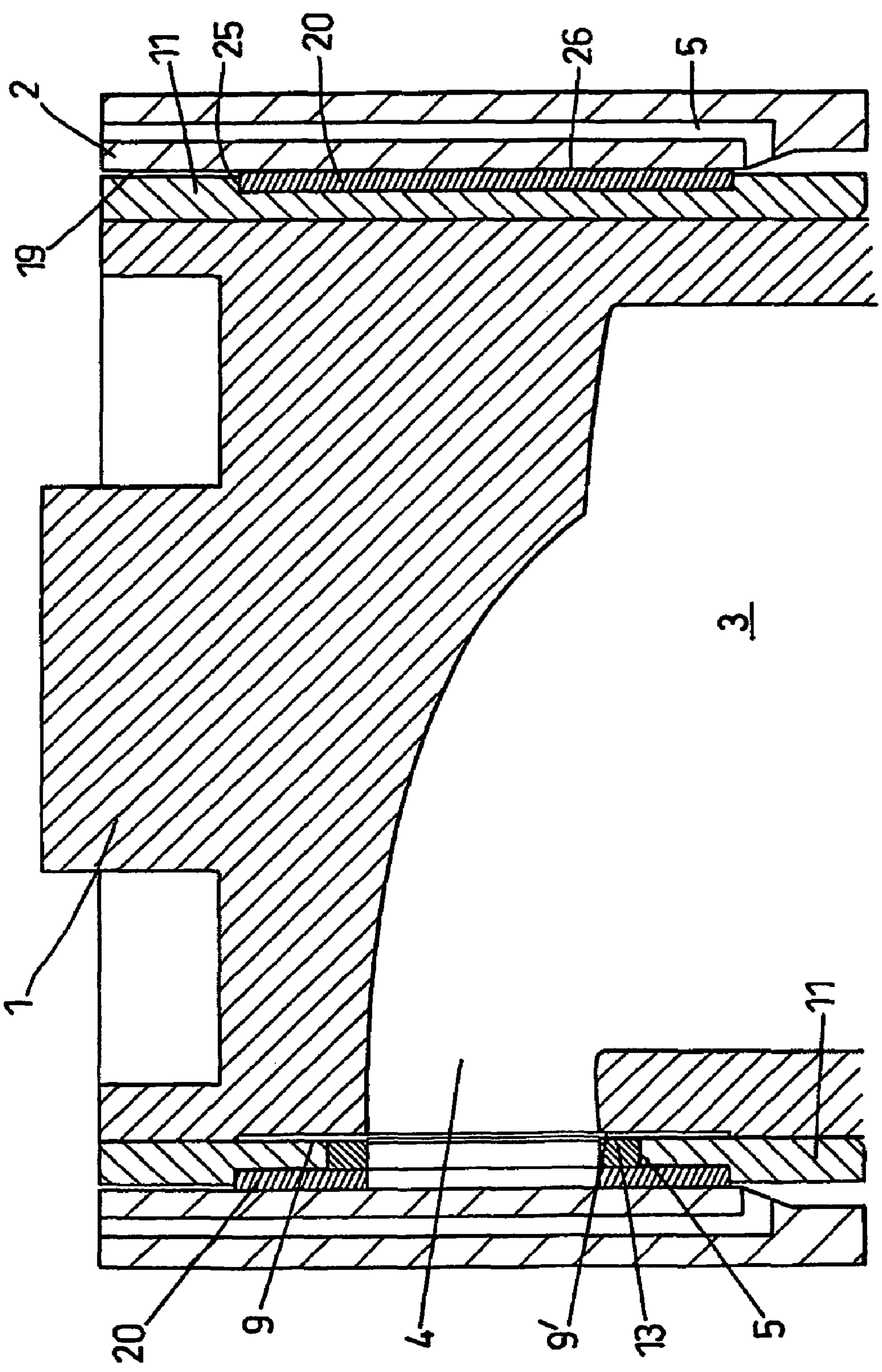
FIG. 4 is a cross sectional side view of the top end of a rotary cylinder valve engine having a sealing mechanism in accordance with the fourth aspect of the current invention.
Figure 5:
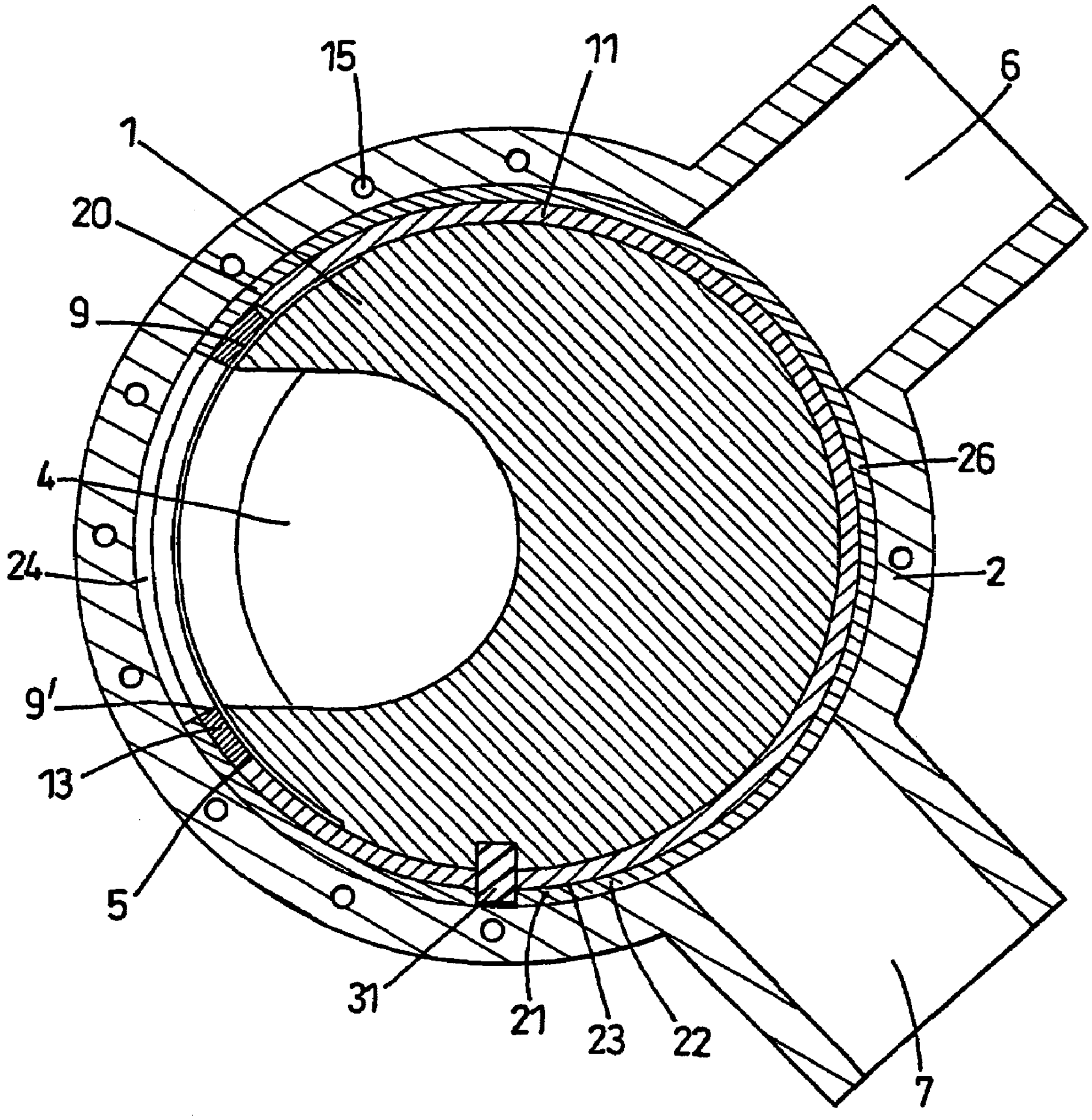
FIG. 5 is a cross sectional top view of the valve and sealing mechanisms of FIG. 4.
Figure 6:
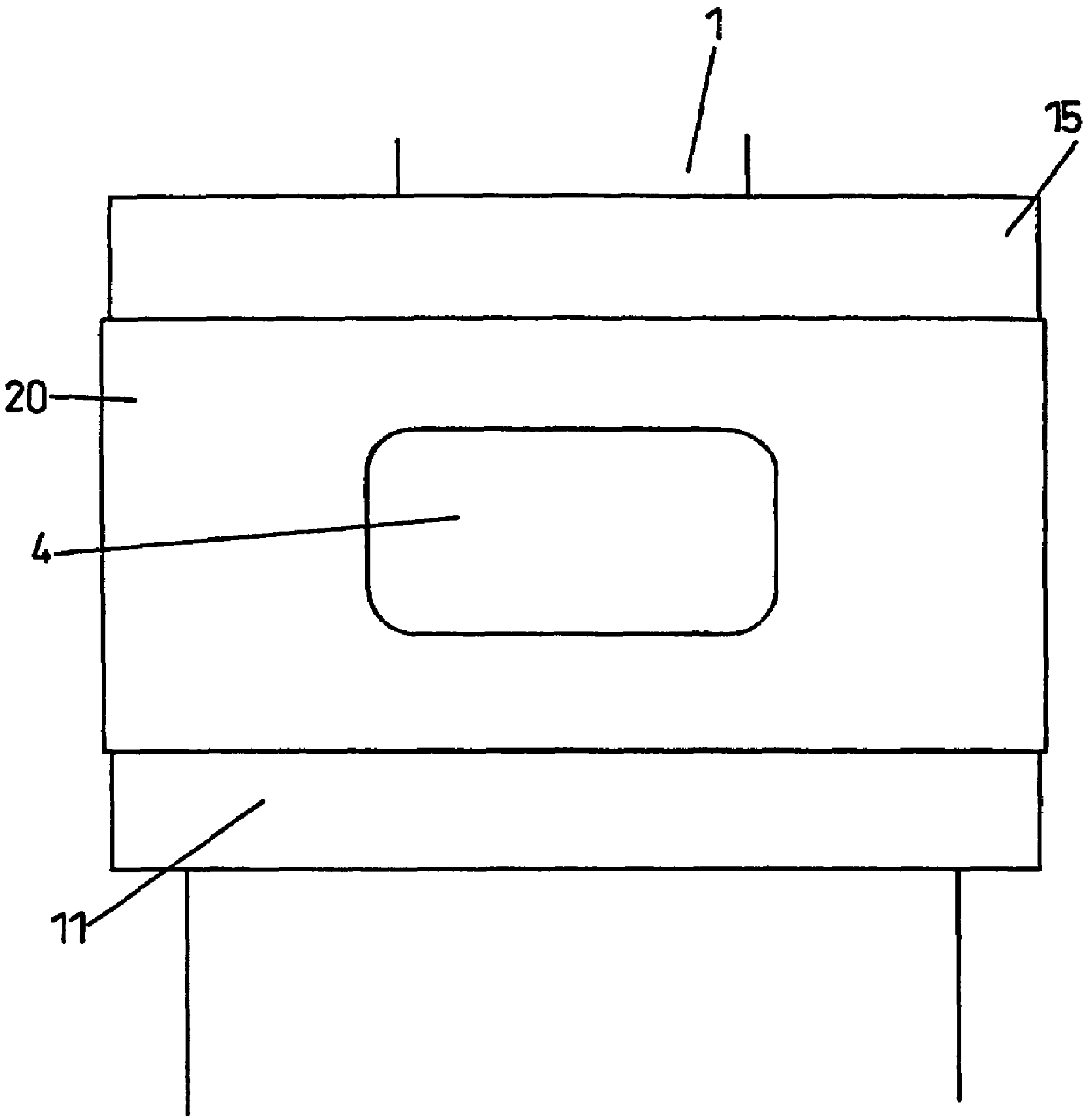
FIG. 6 is a side view of the valve and sealing mechanisms of FIGS. 4 and 5.

Referring now to FIGS. 4 to 6 a rotating first cylindrical valve element 1 and a fixed second cylindrical valve element 2 are shown with like features being given like references. The sealing mechanism as previously described with reference to FIGS. 1 to 3 is mounted on the first cylindrical valve element 1, the sealing mechanism including the sealing frame 13, the cantilevered plate 9 and the sleeve 5 securing the plate 9 to the first cylindrical valve element 1. In this embodiment, the sealing frame 13 does not act as a sealing and bearing surface with the second cylindrical valve element 2 but acts as a compression seal between the plate 9 and a tubular element 20. The sealing frame 13 transfers the radially outwardly directed force from the cantilever portions 9*a* of the plate 9 to the tubular element 20.

The tubular sealing element 20 is formed from a strip of material that is curved such that two opposed ends 21, 22 of the strip face each other, the two ends 21, 22 being substantially parallel. A small gap 23 is defined between the two ends 21, 22 such that the diameter of the tubular element 20 can be decreased by moving the two ends 21, 22 towards one another to reduce the gap 23.

A rectangular aperture 24 is formed in one side of the tubular element 20, the size and shape of the aperture 24 being substantially the same as that of the first valve port 4 in the first cylindrical valve element 1. The tubular element 20 is made from a resiliently deflectable material such that, when the diameter of the tubular element 20 is reduced by the application of pressure to the tubular element 20, the tubular element 20 returns to its original diameter when the pressure is removed.

In this embodiment, the sleeve 11 is modified to define a peripheral recess 25 which extends around the sleeve 11 and is dimensioned to receive the tubular element 20.

This embodiment of the invention is assembled in the same way as described with reference to FIGS. 1 to 3 except that, after the sealing frame 13 has been placed on the cantilevered inner portion 9*a* of the plate 9, the tubular element 20 is slid around the first cylindrical valve element 1 until the tubular element 20 is received in the peripheral recess 25 in the sleeve 11. When so received, the tubular element 20 is constrained from moving axially of the first cylindrical valve element 1 but is radially movable.

The tubular element 20 is driven by the first cylindrical valve element 1 to rotate with the first cylindrical valve element 1 such that the aperture 24 in the tubular element 20 is aligned with the valve port 4 in the first cylindrical valve element 1.

A dowel or bolt 31 extends through the tubular element 20 and into part of the first cylindrical valve element 1 to attach the tubular element 20 to the first cylindrical valve element 1 and in use to drive the tubular element 20.

Alternatively a first lug is provided on the tubular element 20 and a second lug is provided on the first cylindrical valve element 1, rotation of the first cylindrical valve element 1 causing the lugs to engage to drive the tubular element 20.

The gap 23 in the tubular element 20 is adjacent but rotationally in front of the point of attachment, the arrangement being such that, in use, the substantial portion of the tubular element 20 is rotationally behind the point of attachment, minimising any tendency of the diameter of the tubular element 20 to increase due to its own frictional drag.

The assembly is then located in a rotary cylinder valve engine. It will be appreciated that, during assembly, pressure has to be applied to the exterior of the tubular element 20 so that the diameter of the tubular element 20 decreases sufficiently to enable the tubular element 20 to be received within the second cylindrical valve element 2. When so received, the resilient nature of the tubular element 20 causes the diameter of the tubular element 20 to expand to its original size such that the tubular element 20 sealingly engages the second cylindrical valve element 2. The tubular element 20 is not in contact with the sleeve 11 such that there is a clearance 26 between the tubular element 20 and the sleeve 11. However, in the region of the valve port 4, the cantilevered inner portion 9*a* of the plate 9 biases the sealing frame 13 radially outwardly into contact with the tubular element 20. This moves the part of the tubular element 20 adjacent the valve port 4 into sealing engagement with the second cylindrical valve element 2.

Thus, the part of the tubular element 20 adjacent the valve port 4 provides a primary seal between the combustion chamber 3 of the first cylindrical valve element 1 and the second cylinder valve element 2 whilst the remainder of the tubular element 20 provides a secondary seal between the inlet and exhaust ports 6, 7 and the internal parts of the engine. The primary seal prevents or at least inhibits gas flowing from the combustion chamber 3 and escaping between the sealing mechanism 8 and the second cylindrical valve element 2 whilst the secondary seal prevents or at least inhibits lubricating oil and coolant flowing between the first cylindrical valve element 1 and the inlet, ignition and outlet ports.

Figure 7:
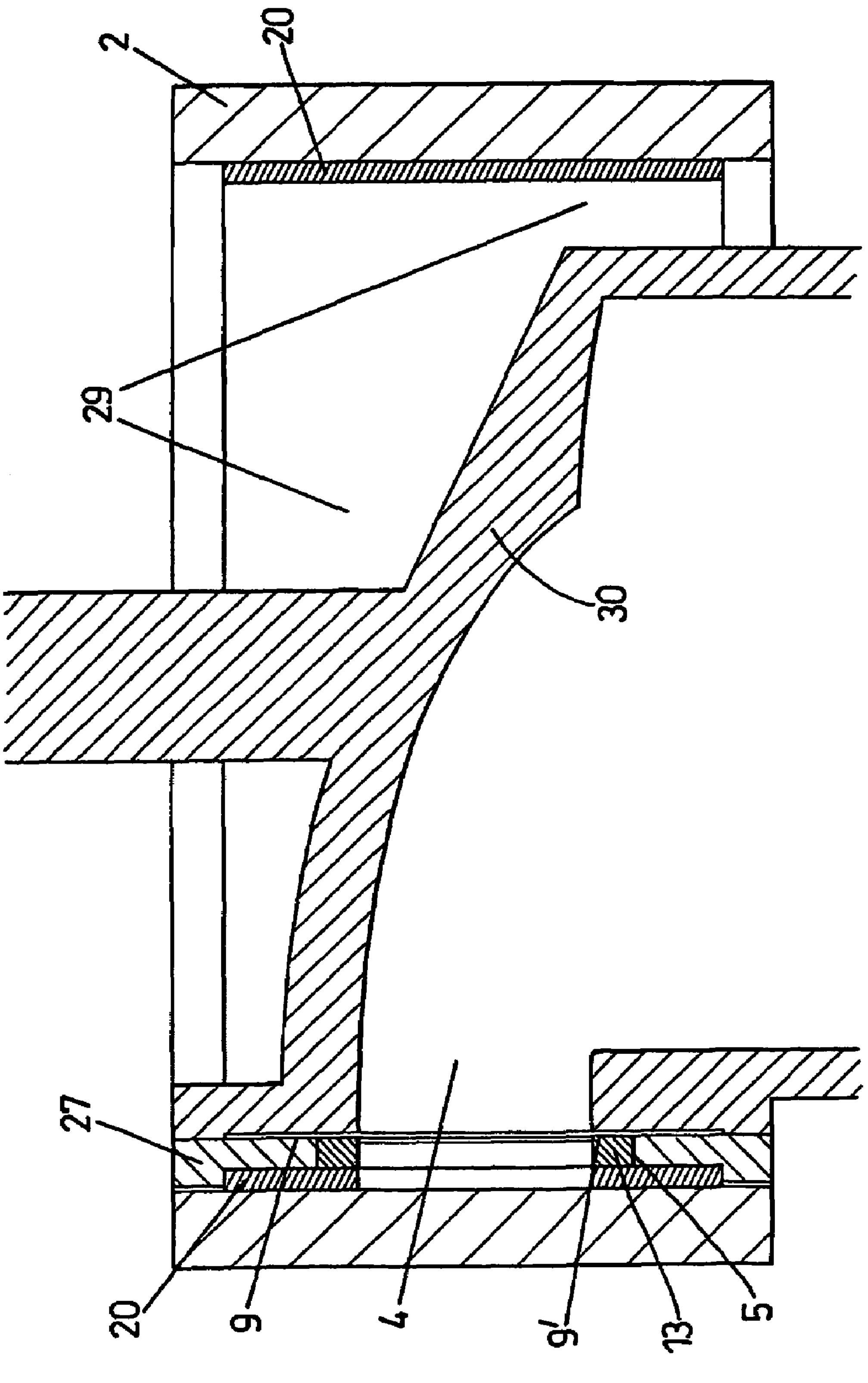
FIG. 7 is a cross sectional side view of the top end of an alternative rotary cylinder valve engine having the sealing mechanism of FIGS. 3 to 6.
Figure 8:
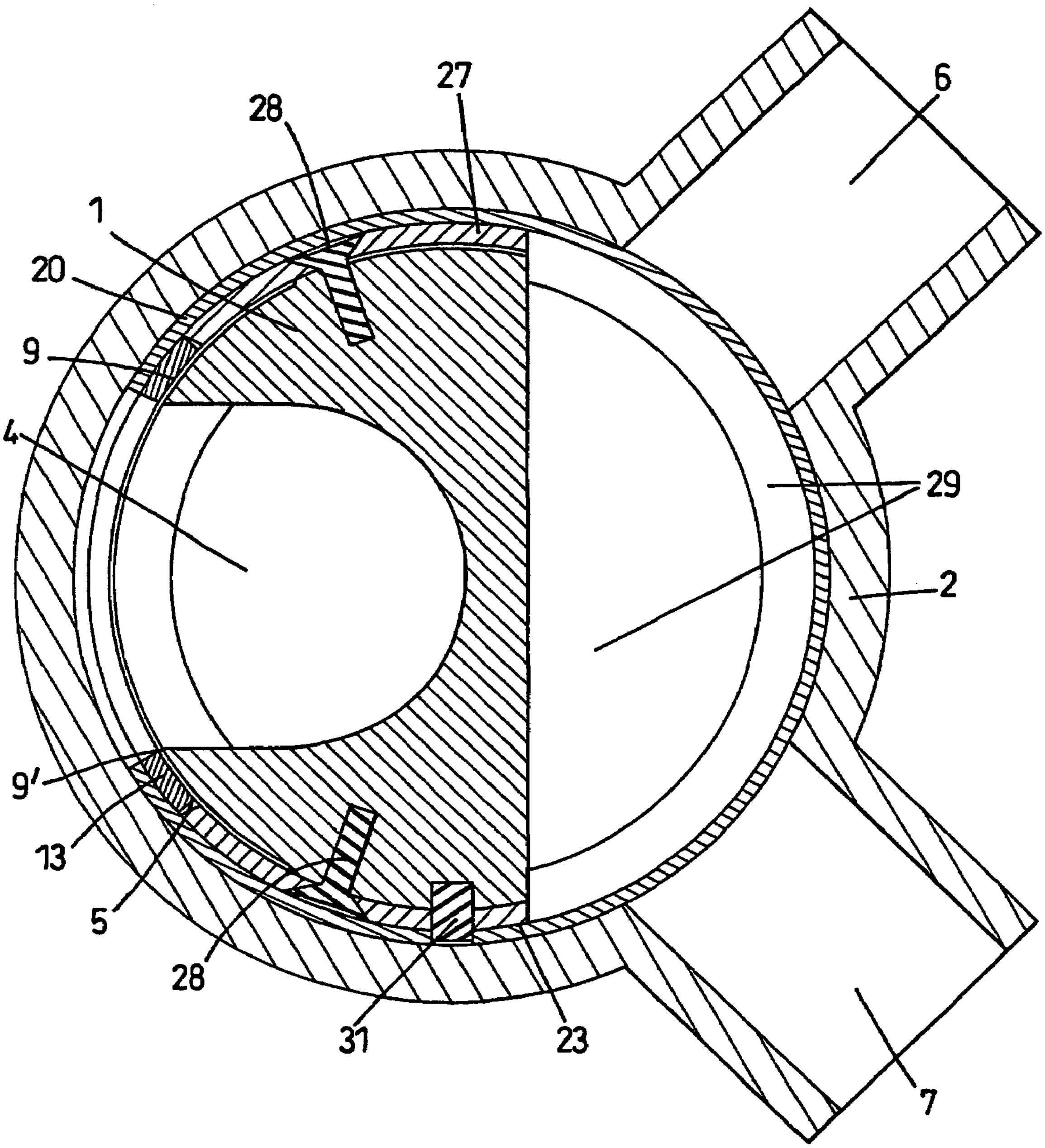
FIG. 8 is a cross sectional top view of the valve and sealing mechanism of FIG. 7.

Referring now to FIGS. 7 and 8 the plate 9 is clamped in place by a clamping piece 27 held in place by two fasteners 28 as opposed to the tubular sleeve 11 of the previous embodiments.

Also in this embodiment, a direct cooling channel 29 extends between the inner surface of the tubular element 20 and the outer surface of the rotating first cylindrical valve element 1. The cooling channel 29 begins at the ceiling 30 of the first cylindrical valve element 1 and extends downwardly between the tubular element 20 and the first cylindrical valve element 1.

Cooling fluid is pumped onto the ceiling 30 of the first cylindrical valve element 1 and through the direct cooling channel 29. This allows cooling fluid to directly cool a large proportion of the surface of the first cylindrical valve element 1. When this cooling method is employed the gap 23 between the ends 21, 22 of the tubular element 20 is more tightly controlled to limit lubricant contamination of the combustion stream. Alternatively a separate sealing mechanism may be employed to limit lubrication flow through the gap 23.

Whilst the above embodiments have been described with reference to a rotary valve engine, it will be appreciated that the valve seal mechanisms described could also be used on any other device comprising a rotary cylinder valve such, for example, a pump.

Further to this, the valve seal mechanism could be used for any valve arrangement comprising two valve ports providing fluid communication between two chambers and there being a differential pressure between the two chambers. The sealing mechanisms could alternatively be mounted on the second cylindrical valve element 2 as opposed to the first cylindrical valve element 1. This would be necessary if the sealing mechanisms were used on a pump having a rotary valve and the pressure within the chamber of the first cylindrical valve element was lower than the pressure outside the chamber.

Whilst the embodiment of FIGS. 1 to 3 functions adequately, the rear face of the sealing frame 13 is curved which is difficult to seal against. Also the cantilevered plate 9 can be difficult to assemble, exhibits a comparatively high leak rate, and also has comparatively little spring movement to cope with production tolerance and thermal movement.

Figure 9:
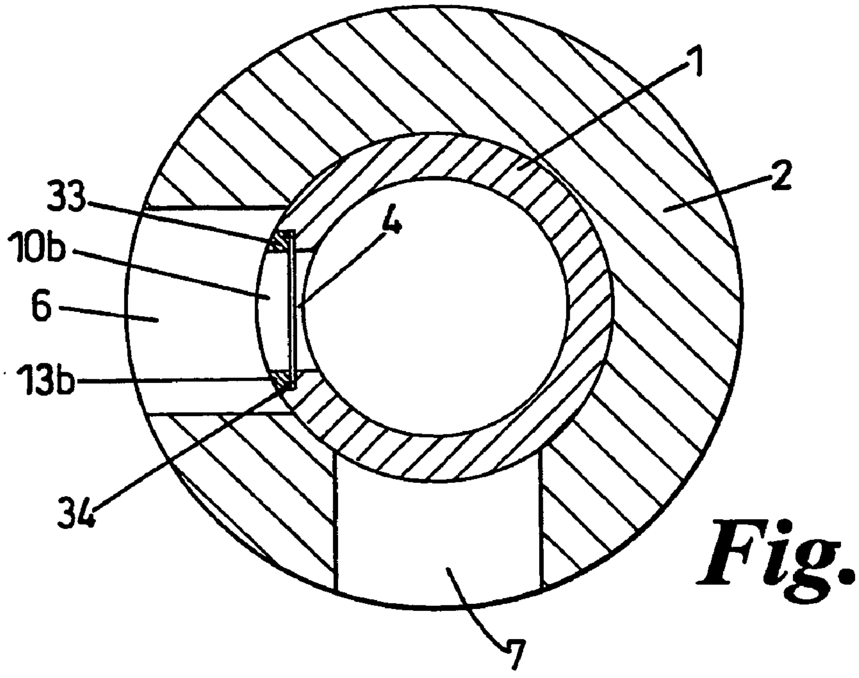
FIG. 9 is a cross sectional top view of an alternative rotary cylinder valve engine.
Figure 10:
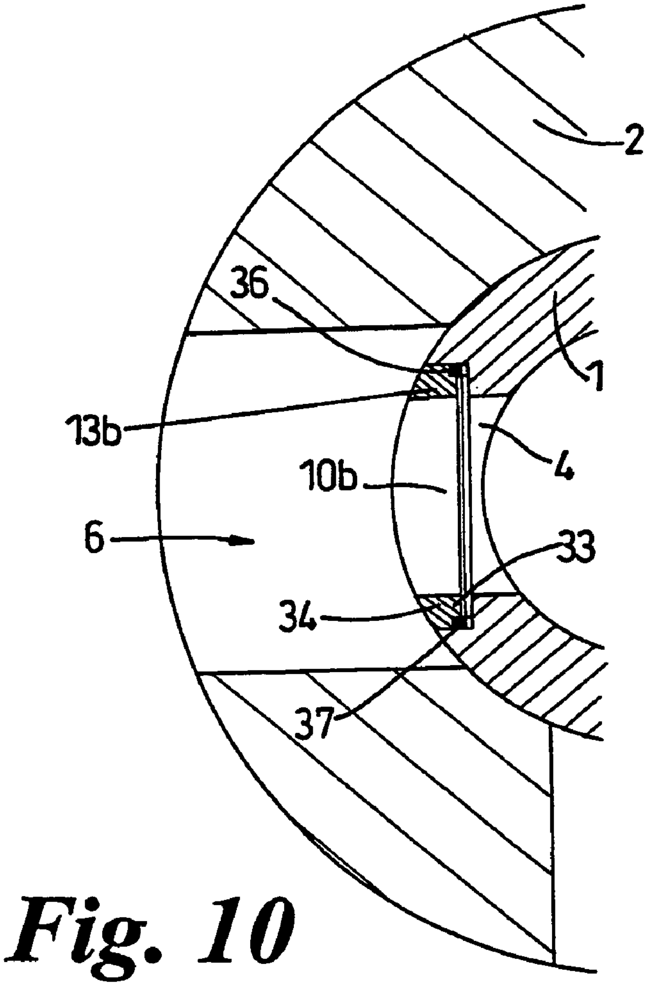
FIG. 10 is an enlarged view of part of the rotary cylinder valve engine shown in FIG. 9.

In the alternative embodiment shown in FIGS. 9 and 10, like features have been given like reference numerals.

The first cylindrical valve element 1 is formed with a shallow, flat bottomed bore 32 which is coaxial with the valve port 4. A sealing frame comprises a disc 13*b* of circular outline formed with a central aperture 10*b*. The disc 13*b* is dimensioned to be received within the bore 32. The rear face 33 of the disc 13*b* is planar whilst the front face 34 of the disc 13*b* is curved, the radius of the curve being substantially identical to the radius of curvature of the first cylindrical valve element 1. The rear face 33 is shown formed with a peripheral indent 35 although this is optional.

A sealing ring 36, of similar structure to a piston ring as would be found on a standard engine, is provided and is received in the indent 35 of the disc 13*b*. The sealing ring 36 is formed from a strip of metal bent into a circular outline. The opposed ends of the sealing ring 36 are thus adjacent one another but spaced a small distance apart.

A biasing means is provided comprising a spring 37 of circular outline, dimensioned to be received in the flat bottomed bore 32. The spring 37 is a wave spring in that the spring 37 has a wavy cross section. Thus the crest of one wave is spaced from the trough of an adjacent wave. This space can be reduced by deforming the waves and this deformation provides the biasing function.

The arrangement is assembled by first placing the wave spring 37 in the circular bore 32 so that the trough of each wave of the wave spring 37 rests on the flat bottom of the bore 32.

The sealing ring 36 is then placed in the circular bore and rests on the crests of the wave spring 37. The sealing ring 36 is thus compressed so that the gap between the adjacent ends of the sealing ring 36 reduces and so that the diameter of the sealing ring 36 is less than the diameter of the flat bottomed bore 32. The sealing frame 13*b* can then be slid into the bore 32 until the sealing frame 13*b* abuts sealing ring 36. This assembled condition is shown in FIGS. 9 and 10.

When assembled the wave spring 37 bears upon the sealing ring 36 which bears upon the planar lower surface of the sealing frame 13*b*. This biases the sealing frame 13*b* radially outwardly of the first cylindrical valve element 1 so that the sealing frame 13*b* sealingly engages the second cylindrical valve element 2. The wave spring also biases the sealing ring 36 into sealing engagement with the sealing frame 13*b*. The front face of the sealing frame 13*b* is curved so as to be able to rotate against the second cylindrical valve element 2.

The sealing ring 36 expands radially outwardly when received in the flat bottomed bore 32 so that the outer surface of the sealing ring 36 sealingly engages the peripheral wall of the bore 32. The upper surface of the sealing ring sealing engages the sealing frame 13*b*.

It will be appreciated that there is a gap between adjacent crests and adjacent troughs of the wave spring 32. These gaps, in use, allow gas pressure within the first cylindrical valve element 1 to act on the sealing ring 36 to augment the seal with the sealing frame 13*b* and also to force the sealing ring 36 outwardly to augment the seal with the peripheral wall of the bore 32. Further to this, the wave spring 37 had a greater range of travel than the biasing means of the other embodiments of the invention and thus is better able to deal with production tolerances and, in use, with thermal movements within the engine.

It will be appreciated that the flat bottomed bore 32 must not extend too far into the first cylindrical valve element 1 or the wall thickness of the first cylindrical valve element 1 in the region adjacent the bore 32 would be too thin to absorb the forces and thermal movements acting, in use, on the first cylindrical valve element 1.

Thus, to fit the sealing frame 13*b*, the sealing ring 36 and the wave spring 37 within the bore 32 the diameter of the cylinder port 4 should be reduced. In order to preserve the same valve timing the width of the inlet and exhaust ports 6, 7 formed in the second cylindrical valve element 2 should be increased by a corresponding amount. Thus, as can be seen in FIGS. 9 and 10, the inlet port 6 and exhaust port 7 are wider than the valve port 4 formed in the first cylindrical valve element 1. Thus when the inlet port 6 is aligned with the valve port 4, there is a step in the inlet tract. Similarly, when the outlet port 7 is aligned with the valve port 4, there is a step in the exhaust tract.

The invention claimed is:

1. A valve seal mechanism for a rotary valve comprising a first cylindrical valve element and a second cylindrical valve element each formed with a respective valve port, the first cylindrical valve element being rotatable relative to the second cylindrical valve element to a position in which the ports in each cylindrical valve element are aligned, the seal mechanism comprising a substantially rigid sealing frame adapted to substantially surround the periphery of the valve port of the first cylindrical valve element to rotate with the first cylindrical valve element, the arrangement being such that, in use, an outer curved surface of the sealing frame sealingly engages a radially inner surface of the second cylindrical valve element, a sealing element being provided to effect a seal between the sealing frame and the first cylindrical valve element, a predetermined surface area of the sealing frame being exposed to an internal chamber of the first cylindrical valve element such that the pressure within the internal chamber acts on a predetermined surface area of the sealing frame to bias the sealing frame into sealing engagement with the second cylindrical valve element.

2. A valve seal mechanism for a rotary valve element comprising a first and a second cylindrical valve element each formed with a respective valve port, the first cylindrical valve element being rotatable relative to the second cylindrical valve element to a position in which the ports in each cylindrical valve element are aligned, the seal mechanism comprising a sealing frame adapted to substantially surround the periphery of the valve port of the first cylindrical valve element, a radially outer curved surface of the sealing frame sealingly engaging a radially inner surface of a tubular element, a sealing element being provided to effect a seal between the sealing frame and the first cylindrical valve element, the tubular element being formed with an aperture, and being adapted to be mounted on the first cylindrical valve element to extend substantially around the first cylindrical valve element such that the aperture of the tubular element is radially aligned with the valve port of the first cylindrical valve element, the tubular element being resiliently biased radially outwardly of said first cylindrical valve element, such that a part of the tubular element that surrounds the aperture sealingly engages the second cylindrical valve element.

3. A valve seal mechanism for a rotary valve, the rotary valve comprising a first and a second cylindrical valve element each formed with a respective valve port, at least one of the valve elements being rotatable relative to the other to a position in which the ports in each cylindrical valve element are aligned, the sealing mechanism comprising a sealing frame and biasing means comprising a first portion adapted to sealingly engage with the first cylindrical valve element and a second portion adapted to sealingly engage with the sealing frame, the biasing means being such that, in use, the biasing means biases the sealing frame in a radial direction from the first cylindrical valve element, wherein the sealing frame and biasing means are separate components and the biasing means comprises a spring, a portion of which is disposed between the sealing frame and the first cylindrical valve element, the spring comprising a cantilevered element, an outer periphery of which is adapted to be secured to the first cylindrical valve element so as to be constrained relative to the first cylindrical valve element, and an inner portion of which is spaced from the outer peripheral portion in a direction generally towards a longitudinal axis of the valve port of the first cylindrical valve element, the arrangement being such that, in use, the inner portion of the spring is movable radially relative to the first cylindrical valve element and the inner portion is in contact with part of the sealing frame.

4. The valve seal mechanism of claim 1 wherein the sealing frame is held within a recess on the first cylindrical valve element.

5. A rotary valve cylinder engine incorporating the sealing mechanisms of any one of claims 1, 2, or 3.

6. The valve seal mechanism of claim 1 or claim 2 wherein the radially outer curved surface of the sealing frame sealingly engages with a sealing force which increases with the pressure within the internal chamber.

7. The valve seal mechanism of claim 6 wherein the arrangement is such that the peak sealing force due to the pressure within the combustion chamber is always less than or equal to 200 kg force per 50 $cm^3$ of combustion chamber capacity.

8. The valve seal mechanism of claim 7 wherein the peak sealing force due to the pressure within the combustion chamber is always less than or equal to 100 kg force per 50 $cm^3$ of combustion chamber capacity.

9. The valve seal mechanism of claim 4 wherein the recess comprises a bore.

10. The valve seal mechanism of claim 9 wherein the bore is co-axial with the valve port of the first cylindrical valve element.

11. The valve seal mechanism of claim 9 wherein the bore and sealing frame are of circular outline.

12. The valve seal mechanism of claim 9 wherein the bore has a planar base and the sealing frame comprises a rear, planar surface radially inwardly of the outer, curved surface.

13. The valve seal mechanism of claim 12 wherein the sealing element comprises a sealing ring which extends around the periphery of the bore so as to abut the planar surface of the sealing frame.

14. The valve seal mechanism of claim 13 wherein the sealing ring is formed from a strip of metal material bent into a substantially circular shape so that the two ends of the strip are adjacent one another to define a gap therebetween.

15. The valve seal mechanism of claim 14 wherein the gap has to be decreased to enable the sealing ring to be inserted into the bore formed in the first cylindrical valve element.

16. The valve seal mechanism of claim 15 further comprising biasing means adapted to bias the sealing frame and the sealing ring radially outwardly of the first cylindrical valve element in a direction towards the second cylindrical valve element.

17. The valve seal mechanism of claim 16 wherein the biasing means comprises a wave spring having a plurality of crested and troughed regions, the crested regions being in contact with the base of the bore and the troughed regions being in contact with the sealing ring.

18. The valve seal mechanism of claim 17 wherein the spring abuts the sealing element so as to bias the sealing element into engagement with the sealing frame and the first cylindrical valve element.

19. The valve seal mechanism of claim 16 wherein an inner portion of the sealing frame is spaced from the first cylindrical valve element by the biasing means so that a predetermined surface area of a radially inner portion of the sealing frame is exposed to a chamber within the first cylindrical valve element, the arrangement being such that, in use, the pressure within the chamber acts on the predetermined surface area of the sealing frame to further bias the sealing frame in a radial direction from the first cylindrical valve element.

20. The valve seal mechanism of claim 16 wherein the valve port formed in the first cylindrical valve element is of smaller diameter than the valve port or ports formed in the second cylindrical valve element.

21. The valve seal mechanism of claim 17 wherein the biasing means has a dual function to both bias the sealing frame radially outwardly of the first cylindrical valve element whilst also providing sealing engagement between the sealing frame and the first cylindrical valve element.

22. The valve seal mechanism claim 1 wherein either the sealing frame of the seal mechanism or the lining of the second cylindrical valve element is made from a bronze alloy material.

23. The valve seal mechanism of claim 22 wherein the sealing frame is made from a bronze alloy material and the lining of the second cylindrical valve element is made from a harder material.

24. The rotary cylinder valve engine of claim 1 comprising a rotatable cylinder formed with an internal combustion chamber in communication with a first valve port, a second cylindrical valve element comprising a second cylinder formed with at least a second valve port, the first cylinder being rotatable relative to the second cylinder and the second cylinder being fixed relative to the engine casing.

25. The rotary cylinder valve engine of claim 24 wherein the second cylinder has a fuel inlet port and an exhaust outlet port, the port on the first cylinder being rotatable to index with the respective inlet port and exhaust port.

26. The rotary cylinder valve engine of claim 25 comprising a third ignition port.

27. The valve seal mechanism of claim 2 wherein the tubular element is resiliently deflectable such that the diameter of the tubular element is variable.

28. The valve seal mechanism of claim 27 wherein the tubular element is formed from a strip of material that is curved such that two ends of the strip face each other, the tubular element being such that the ends are substantially parallel to, and spaced a small distance apart from, one another to define a gap between the two ends, the gap enabling the diameter of the tubular element to be varied.

29. The valve seal mechanism of claim 28 wherein a part of the tubular element that surrounds the aperture of the tubular element is biased further radially outwardly of the first cylindrical valve element by biasing means located between the first cylindrical valve element and the tubular element.

30. The valve seal mechanism of claim 29 wherein the remainder of the tubular element sealingly engages the second cylindrical valve element but is spaced from the first cylindrical valve element to define a clearance between the first cylindrical valve element and the tubular element.

31. The valve seal mechanism of claim 30 wherein, in use, the first cylindrical valve element is cooled by directing cooling fluid through the clearance between the first cylindrical valve element and the tubular element so that the cooling fluid directly cools the surface of the first cylindrical valve element.

32. The valve seal mechanism of claim 31 wherein the cooling fluid is oil and thus also lubricates the first cylindrical valve element.

33. The valve seal mechanism of claim 32 wherein the tubular element is attached to the first valve element, the arrangement being such that, in use, the tubular element is driven by the first cylindrical valve element and the aperture in the tubular element is aligned with the valve port in the first cylindrical valve element.

34. The valve seal mechanism of claim 33 wherein the tubular element is attached to the first valve element by a dowel or bolt which extends through the tubular element and into part of the first cylindrical valve element.

35. The valve seal mechanism of claim 33 wherein the tubular element is attached to the first valve element by a first lug on the tubular element and a second lug on the first cylindrical valve element, rotation of the first cylindrical valve element causing the lugs to engage.

36. The valve seal mechanism of claim 35 wherein the gap in the tubular element is adjacent but rotationally in front of the point of attachment, the arrangement being such that, in use, the tubular element is rotationally behind the point of attachment so minimising any tendency of the diameter of the tubular element to increase due to its own frictional drag.

37. The valve seal mechanism of claim 2 wherein the tubular element is adapted to be mounted in a circumferential recess in the first cylindrical valve element, the arrangement being such that the tubular element is restrained from axial movement relative to the first cylindrical valve element but being radially movable.

38. The valve seal mechanism of claim 3 wherein the cantilevered element of the spring comprises a resiliently deflectable plate having a central aperture, the outer periphery of the plate being adapted to be secured to the first cylindrical valve element such that the outer periphery is constrained from moving relative to the first cylindrical valve element, an inner portion of the plate being spaced from the outer peripheral portion in a direction generally towards a longitudinal axis of the valve port of the first cylindrical valve element so that the inner portion is cantilevered.

39. The valve seal mechanism of claim 38 wherein the plate is constrained so that the aperture in the plate is aligned with the valve port of the first cylindrical valve element, the inner portion of the plate being in contact with the periphery of the sealing frame the arrangement being such that the sealing frame is biased radially outwardly of the first cylindrical valve element by the inner portion of the plate.

40. The valve seal mechanism of claim 38 wherein the inner portion of the plate is spaced from the first cylindrical valve element such that a recess is defined between the inner portion of the plate and the first cylindrical valve element so that a predetermined surface area of a radially inner portion of the plate is exposed to a chamber within the first cylindrical valve element, the arrangement being such that, in use, the pressure within the chamber acts on the predetermined surface area of the plate to further bias the inner portion of the plate and the sealing frame in a radial direction from the first cylindrical valve element.

41. The valve seal mechanism of claim 3 wherein the spring has a dual function to both bias the sealing frame radially outwardly of the first cylindrical valve element whilst also providing sealing engagement between the sealing frame and the first cylindrical valve element.

42. The valve seal mechanism of claim 3 wherein the spring is manufactured from a metal material.

43. The valve seal mechanism of claim 42 wherein the spring is a sheet metal.

44. The valve seal mechanism of claim 3 wherein the spring is slidingly received within a bore formed in the first cylindrical valve element, the bore being coaxial with the valve port formed in the first cylindrical valve element, the spring biasing the sealing frame radially outwardly of the first cylindrical valve element.

45. A substantially rigid sealing frame for the valve seal mechanisms of claims 1, 2, or 4.

* * * * *